C. H. SMOOT.
FIELD MAGNET AND WINDING FOR ELECTRICAL MACHINES.
APPLICATION FILED FEB. 16, 1907. RENEWED JUNE 22, 1912.
1,054,047.
Patented Feb. 25, 1913.
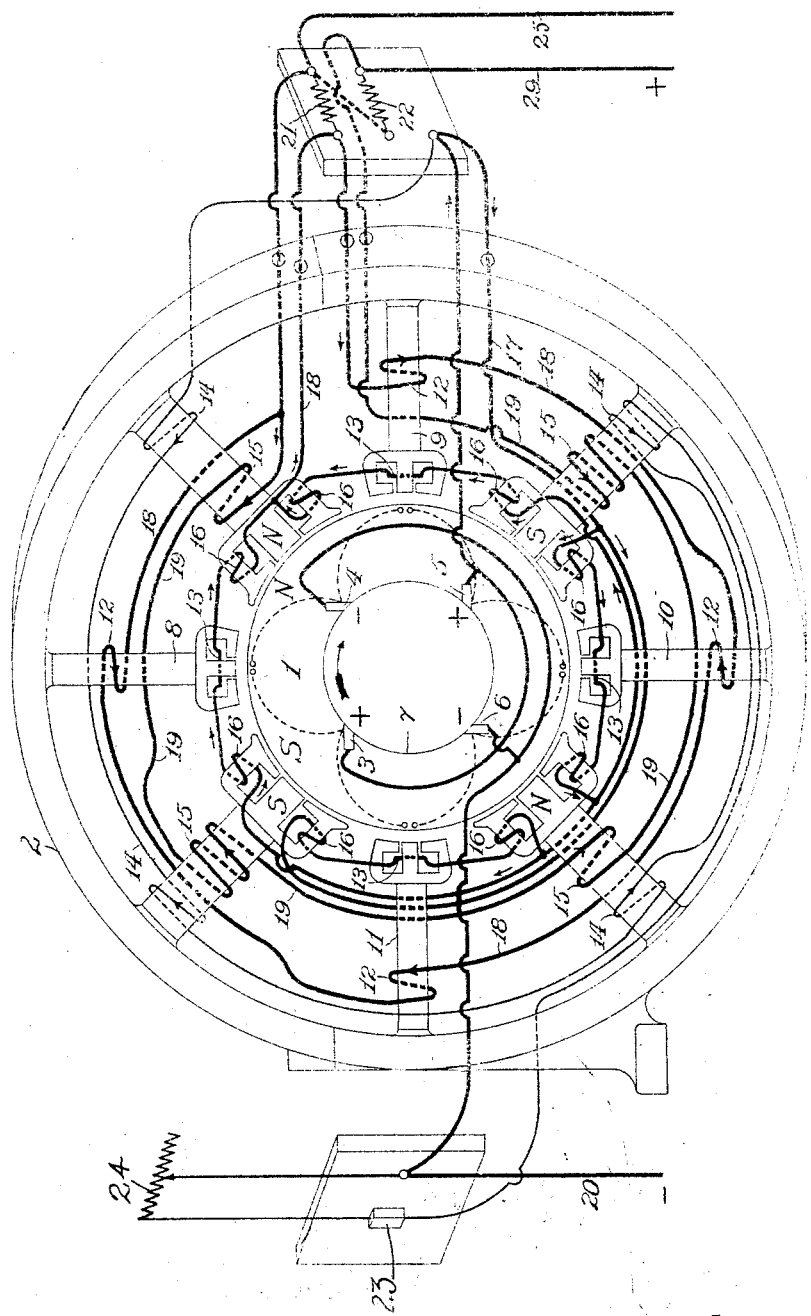
Witnesses:
Inventor:
Charles H. Smoot.
By Barton, Tanner & Folk,
Atty's.

UNITED STATES PATENT OFFICE.

CHARLES H. SMOOT, OF CHICAGO, ILLINOIS, ASSIGNOR TO RATEAU TURBINE COMPANY, OF CHICAGO, ILLINOIS, A CORPORATION OF WEST VIRGINIA.

FIELD-MAGNET AND WINDING FOR ELECTRICAL MACHINES.

1,054,047.  Specification of Letters Patent.  Patented Feb. 25, 1913.

Application filed February 16, 1907, Serial No. 357,664. Renewed June 22, 1912. Serial No. 705,311.

*To all whom it may concern:*

Be it known that I, CHARLES H. SMOOT, a citizen of the United States, residing at Chicago, in the county of Cook and State of Illinois, have invented a certain new and useful Improvement in Field-Magnets and Windings for Electrical Machines, of which the following is a full, clear, concise, and exact description.

My invention relates to dynamo electric machines such as generators and motors, with particular reference to dynamos of the direct current type.

The object is to provide an improved field magnet structure and an organization of windings therefor, such that the armature reaction upon the field will be compensated for, and sparkless commutation secured; while the structure is simple, easily built and assembled and convenient in arrangement.

The invention is illustrated in the accompanying drawing, which is a diagram illustrating the magnetic structure and electrical organization of a four-pole generator provided with commutating-poles intermediate the main poles.

The armature 1 rotates in the magnetic field established by the four pole-pieces N, N, S, S, which project inwardly from the field-magnet frame 2. Brushes 3, 4, 5 and 6 bear upon the commutator (indicated by the circle 7); and while these brushes are located in radial line with the main field poles, it will be understood that the armature winding is of the usual modern type in which the leads to the commutator are diagonally disposed, the segments upon which the brushes rest being connected with armature coils located at the neutral points approximately midway between the main field poles. In other words, when a given armature coil is undergoing commutation by the brush resting upon the corresponding commutator-segments forming the terminals of such coil, it is in the act of passing from the influence of one field pole to the influence of the succeeding pole. Commutating poles 8, 9, 10 and 11 are provided upon the field magnet, facing the armature at points midway between the main poles to act upon the coils undergoing commutation. These commutating poles are for the purpose of building up in these armature coils, while they are short-circuited by the commutator brushes, an electromotive force which will assist in reversing the current therein. Each of these commutating poles has a relatively wide face, over which an average magneto-motive force of proper polarity or direction is maintained by a main energizing coil 12 in series with the armature, and near the face of the commutating poles I provide an auxiliary or "shading coil" 13, also in series with the armature, for the purpose of compensating for the variation in the armature magneto-motive force under the face of the commutating pole.

The field magnet is compound-wound, the shanks of the main field pole pieces carrying shunt coils 14 and series coils 15. The pole pieces are constructed with forked ends or tips facing the armature, the faces thereof being comparatively broad so as to span a large arc of the armature surface; and the prongs or tips of these main poles are provided with individual compensating coils 16 not embracing the commutating poles but acting to approximately correct the distorting effect of the armature reaction across the pole faces.

In the machine shown in the drawing, the circuit may be traced from the positive brushes 3 and 5 which are connected together, through a conductor 17 divided into two parallel branches, each of which branches includes in series the compensating coils 16 and shading coils 13 of half the machine; then said branches unite in a conductor 18 which leads through the energizing coils 12 of the commutating poles and then connects to a conductor 19, which extends through the series coils 15 of the main poles to the conductor 29 of the external circuit. The return conductor 20 from the external circuit is connected direct to the negative brushes 4 and 6 of the machine. The direction of current flow in the various conductors is further indicated by arrows. Connections are also shown whereby a resistance 21 can be included in shunt of the compensating windings 12, and whereby a resistance 22 can be included in shunt of the main series field windings 15, to adjust the strength of the currents in these windings, respectively. The shunt windings 14 of the main poles are connected across the terminals of the machine, in series with a binding post 23 and an adjustable resistance 24.

It is well-known that in an ordinary direct current generator, the current flowing in the armature tends to magnetize the latter along an axis at an angle to the magnetizing effect of the field poles, the result being that unless this cross-magnetization is counteracted, the flux from the field pole to the armature is distorted in the direction of the armature rotation, the density of the flux being much greater at one end or edge of the pole face than it is at the other. This distortion, furthermore, varies in accordance with the load on the armature, becoming greater or less as the armature current increases or decreases.

In accordance with my invention, the field magnet pole is provided with separate tips or prongs about which individual compensating coils 16 are provided, these coils being connected in series with the armature so that the current therein will vary with the armature current, the direction of winding and number of ampere turns being such that the magneto-motive force set up by the compensating coils will oppose and approximately balance the cross-magnetizing effect of the neighboring armature conductors lying under such pole. The field distortion above described is thus corrected for all conditions of load.

I am aware that it has been proposed heretofore to provide large flat "pan-cake" compensating coils spanning the entire distance from one pole to the next and also located midway between the field poles; but such large coils are very expensive, requiring long reaches of copper for end-connections, and being very difficult to apply and mechanically support, while in case repair or adjustment becomes necessary, much labor is involved in removing and replacing the windings. In the arrangement of my invention, the compensating coils, being individual to and surrounding only the mere prongs of the pole tip, are small in size and require only the minimum amount of copper. My coils are thus easily wound and replaced, readily connected in their appropriate circuit, accessible in position and easily removed and replaced in case of repair or adjustment. Each compensating coil may, furthermore, be especially adapted to meet the conditions of the individual pole piece on which it is mounted, instead of being common to two pole-pieces. A further advantage of my invention is that the magnetic structure comprises separate salient pole pieces for the main and commutating poles which are given any desired proportions independent of each other and are energized by independent coils, so that they may be worked at different degrees of saturation.

This is desirable because the main field poles should be highly saturated so as not to vary in strength too greatly with slight changes in voltage of their exciting current, while the magnetic strength of the commutating poles on the other hand should respond directly to changes in the armature current, to meet and balance the cross-magnetizing effect of the latter.

My invention also contemplates the provision of independent shading coils 13 upon the commutating poles, in addition to the energizing coils 12. The last-mentioned coils act to provide a total average flux from the commutating pole sufficient to neutralize the effect of self-induction in the coils undergoing commutation. The shading coils 13 on the other hand, serve to govern the distribution of this total net or average flux so that it will not be unduly distorted by the armature reaction. The current flowing in the armature conductors in the immediate neighborhood of the commutating poles has a reactive effect upon the flux from such poles similar to that which it has upon the main poles, this effect varying with the strength of the armature current as the latter changes under variations of load. In accordance with my invention, the shading coils 13 are provided upon the prongs or tips of the commutating poles and connected in series with the armature, these coils being proportioned and wound so that their magnetic effect will oppose and approximately balance the reactive magnetic effect of the current in the neighboring armature conductors. By this means, distortion of the average flux from the commutating poles is prevented, and this flux is caused to be distributed in the most effective manner to neutralize the self-induction in the coils undergoing commutation, such distribution being substantially unaffected by changes in the load conditions.

In the drawings is shown the equalizing connection 25 commonly used in connecting compound dynamos in parallel.

I claim:—

1. The combination with a dynamo having a field magnet system comprising main poles and intermediate commutating poles, said commutating poles being made up of subdivided polar projections, of means for exciting the main poles to a high degree of saturation, means for magnetizing the commutating poles to a low degree of saturation, varying in intensity with the armature current, and a shading coil individual to and surrounding a portion of each commutating pole, adapted to govern the distribution of the flux from such pole.

2. In an electrical machine, the combination with a field magnet system comprising a yoke, main pole-pieces and intermediate commutating pole-pieces, said main pole-pieces having separate prongs or tips, of a main winding upon each field magnet core, compensating windings individual to and immediately surrounding the prongs of the main pole-pieces, separate windings individual to and immediately surrounding the commutating poles, and shading coils at the tips of the commutating poles, said compensating windings and shading coils being connected in series with the armature circuit.

3. In an electrical machine, the combination with the armature, of a field magnet system comprising a yoke, main pole-pieces and intermediate commutating pole-pieces upon said yoke, said commutating poles being made up of subdivided polar projections, main and compensating field windings, and shading coils individual to and immediately surrounding fractional portions of the commutating poles adapted to govern the local distribution of the flux from said last-mentioned poles.

4. In a magnetic system for dynamos, the combination with main poles and commutating poles, of compensating coils individual to the main poles, independent energizing coils for said commutating poles, and shading coils governing the local distribution of flux from said commutating poles.

5. In a magnetic system for dynamos, the combination with main poles and commutating poles and energizing windings therefor, of independent shading coils on the tips of the commutating poles acting to compensate for armature reaction upon said last-mentioned poles.

6. In a dynamo-electric machine, the combination with an armature and main field poles, of a commutating pole having a relatively wide face, a main exciting winding adapted to provide an average magneto-motive force over said commutating pole face, and an auxiliary winding embracing a portion of said commutating pole face and adapted to compensate for variations in the magneto-motive force of the armature coils under said commutating pole.

In witness whereof, I, hereunto subscribe my name this 13th day of February A. D., 1907.

CHARLES H. SMOOT.

Witnesses:
GEORGE P. BARTON,
GEORGE E. FOLK.